United States Patent [19]

Choiniere et al.

[11] Patent Number: 4,693,324
[45] Date of Patent: Sep. 15, 1987

[54] CURRENT-CARRYING FLEXIBLE HOSE

[75] Inventors: Alcide W. Choiniere; George T. Dunn, Jr., both of Abbeville, S.C.

[73] Assignee: Automation Industries, Inc., Darien, Conn.

[21] Appl. No.: 891,900

[22] Filed: Aug. 1, 1986

[51] Int. Cl.⁴ .................. A47L 9/24; F16L 11/11
[52] U.S. Cl. .................................. 174/47; 138/122; 138/129
[58] Field of Search .............. 174/47; 138/103, 122, 138/129

[56] References Cited

U.S. PATENT DOCUMENTS

| 4,224,463 | 9/1980 | Koerber et al. | 174/47 |
| 4,354,051 | 10/1982 | Kutnyak | 174/47 |
| 4,490,575 | 12/1984 | Kutnyak | 174/47 |
| 4,524,808 | 6/1985 | Fleischer et al. | 138/103 |

OTHER PUBLICATIONS

Flexible Tubing Corporation Drawing No. FT-3238-1, FT-3238-2, Drawn May 24, 1966.
Automation Industries, Inc.-Flexible Tubing Division Drawing (Part) No. 0308-0125-0104, drawn Jan. 15, 1975.

Primary Examiner—Laramie E. Askin
Attorney, Agent, or Firm—Francis N. Carten

[57] ABSTRACT

A current-carrying flexible hose having at least two parallel helical support wires, inner and outer plastic strips wrapped helically about the support wires, and at least one pair of helical electrical conductors disposed on opposite sides of one of the support wires and slidably positioned between the inner and outer plastic strips. Each of the helical electrical conductors comprises a conductive element and a plastic dielectric coating disposed around the conductive element. The plastic dielectric coatings are not bonded to the inner and outer plastic strips so that they may slide therebetween.

11 Claims, 5 Drawing Figures

CURRENT-CARRYING FLEXIBLE HOSE

SUMMARY OF THE INVENTION

The invention is embodied in a helically fabricated flexible hose having at least two parallel helical support wires disposed in multiple lead fashion with each being axially spaced apart from the other. An inner plastic strip is wrapped helically about the support wires and is wider than the lead of each wire, so that it has forward and rearward edge portions overlapping over convolutions of one of the support wires. An outer plastic strip is wrapped helically about longitudinal reinforcing cords, and is wider than the lead of each wire with forward and rearward edge portions overlapping over convolutions of a second support wire. A plastic dielectric coating is disposed about each support wire, and at least one pair of helical conductors are disposed parallel to opposite sides of one of the helical support wires and between the inner strip and the outer strip, the plastic dielectric coatings and the two strips all being bonded together. The helical conductors also have plastic dielectric coatings to provide further electrical insulation in addition to the non-conductive inner and outer plastic strips. The plastic dielectric coatings of the helical conductors are not bonded to the inner and outer strips so that they may slide therebetween.

It is characteristic of this structure that each helical support wire flexes independently of the other, and the structure therefore possesses exceptional flexibility allowing it to drape readily with close bend radius, all of which is important for vacuum cleaner hose. Each of the helical conductors flexes with the helical support wire with which it is associated, and is protected by its helical configuration from longitudinal stresses and by its positioning adjacent to the helical support wires from kinking and excessive flexing. Because they are able to slide in the space they occupy between the inner and outer strips, the helical conductors are not subjected to the stretching and tearing forces which would be transferred from the inner and outer strips if they were bonded to the helical conductors.

DETAILED DESCRIPTION OF THE INVENTION

Figure 1:
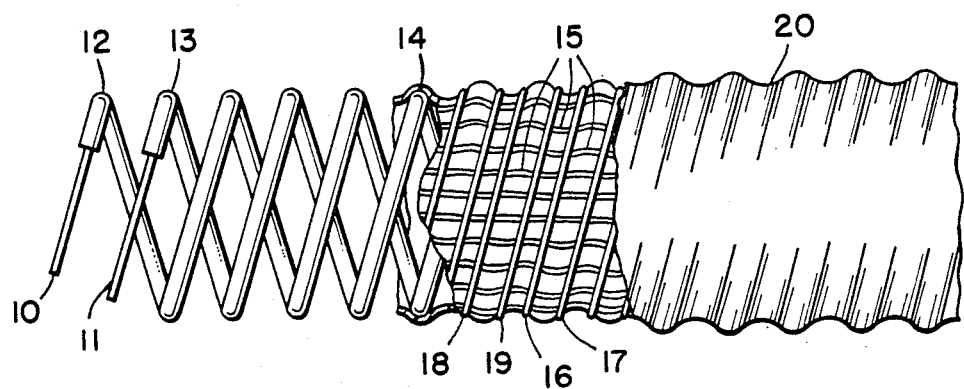
FIG. 1 is a side elevation, partly broken away, of a dual support wire hose embodying the invention.

All of the various components of the hoses embodying the invention are most advantageously assembled on the continuously advancing double belt mandrel of the type described and claimed in U.S. Pat. Nos. 3,155,559 and 4,213,811. Such mandrels are of a diameter ranging from 1.25" to 1.50" and form hose of corresponding inside dimensions. With reference to the first preferred embodiment shown in FIGS. 1 and 2, the elements initially applied to the mandrel are first and second conductive helical support members 10 and 11. Each support member is preferably formed of wire having a steel core and a copper coating in typical diameters from 0.048" to 0.062". The copper content of such wires is usually between 10 and 35 percent by weight. The function of the pair of wires 10 and 11 in the finished product is to provide both a flexible self-supporting skeleton for the hose and a pair of electrical conductors which can carry current between the ends of the hose. Each of the wires 10 and 11 is preferably coated with a concentric layer of vinyl plastic 12 and 13, respectively, the thickness of which is in the order of 0.032". It is the purpose of this plastic coating to provide a bondable surface about which the body of the hose is formed and also to provide electrical insulation. Each of the wires 10 and 11 has a helical pitch of approximately 0.435". It should be noted, however, that the invention is applicable to the hose in which the wires 10 and 11 are not current-carrying, and in such cases the current or currents to be carried from one end of the hose to the other would flow through the one or more pairs of helical conductors which straddle the helical support wires 10 and/or 11. In such a modified embodiment, the helical support wires 10 and 11 would be formed of plastic, for example.

The next element disposed about the pair of helical wires 10 and 11 is an inner plastic strip 14 formed of vinyl, or vinyl blended with other polymers, which is applied with heat or a solvent or both so that it bonds to the coatings 12 and 13. It is wrapped about the wires on the mandrel under tension and at an elevated temperature directly from an extrusion head, so that the inner strip 14 stretches snugly over and between the convolutions of the wires 10 and 11. The extrusion dies may appropriately be cross-sectioned to provide a preformed shape to the strip which conforms to the pair of wires and the mandrel surface. The die design may also impart feathered or tapered edges to the strip so that the overlapping edges fair smoothly into one another.

Figure 2:
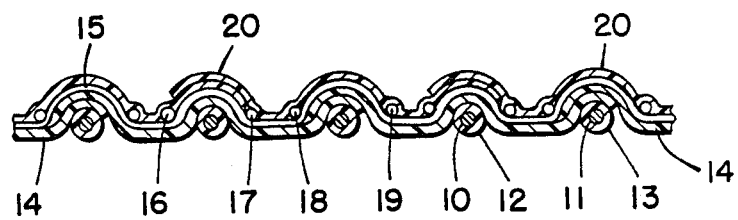
FIG. 2 is an enlarged section of the wall of the hose of FIG. 1.

In thickness the inner strip 14 is in the range from 0.014" to 0.020". The width of the inner plastic strip is slightly greater than the double lead of the pair of wires 10 and 11. As shown in FIG. 2, the rearward edge of the strip 14 thereby overlies the second wire 11, the central portion of the strip 14 overlies the next adjoining convolution of the first wire 10, and the forward edge of the strip 14 overlies the following convolution of the second wire 11. In this manner, the rearward edge of the strip 14 is in direct contact with and bonds to the coating 13 of wire 11, and the forward edge of the strip 14 is in direct contact with and bonds to the rearward edge of the strip 14 on the next convolution of that same wire 11.

After application of the inner strip 14, a plurality of longitudinal cords 15 are preferably applied to the structure. The cords may be of polyester approximately 1100 denier in size. They are uniformly spaced around the circumference of the hose and are typically from nine to thirty-six in number, depending upon the size of hose. They may be precisely parallel to the axis of the mandrel, and thus of the finished hose as well, or they may be applied at an angle to the mandrel axis. In any event, they are at least substantially longitudinal with respect to the hose structure because it is their purpose to lend longitudinal strength to the hose and to prevent it from being stretched to the point of damaging the plastic wall of the hose. The longitudinal cords 15 permit the use of softer wall materials having more plasticity, thus providing better flexibility in the finished product with equal or better strength.

Figure 5:
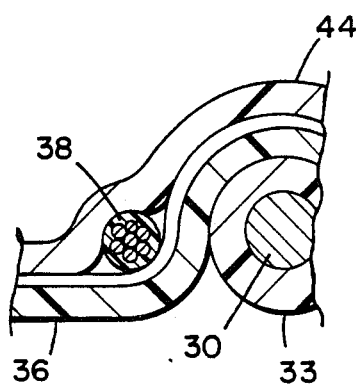
FIG. 5 is an enlarged partial section of FIG. 4.

In order to provide a current path in addition to that formed by coated wires 10 and 11, a pair of helical conductors 16 and 17 are formed as an integral part of the hose by being sandwiched between inner and outer strips 14 and 20 on opposite sides of coated wire 10. The helical conductors 16 and 17 are preferably stranded copper conductors enclosed within a dielectric sheath. Such stranded copper conductors would preferably include relatively small numbers of copper strands, e.g., 5 to 10 30-gauge strands, as shown in FIG. 5. Stranded conductors have been found to be less costly than braided conductors and less susceptible to breaking than solid conductors, although these forms of conductors could also be used. The dielectric sheaths surrounding the stranded copper conductors, though preferred as an extra margin of electrical insulation and mechanical protection, may be eliminated because of the positioning of the helical conductors 16 and 17 between the inner and outer dielectric plastic strips 14 and 20. Each dielectric sheath is not bonded to the strips 14 and 20 so that it may slide with respect to those strips. Bonding is prevented by simply not applying either heat or solvent to the dielectric sheaths of the helical conductors 16 and 17.

A second pair of helical conductors 18 and 19 may be similarly positioned on opposite sides of coated wire 11 to provide an additional current path thorugh the hose. The current paths formed by the helical conductor pairs 16, 17 and 18, 19 may be used for such purposes as carrying motor control signals, current for indicator lamps, and the like. Hose weight and flexibility are not adversely affected by the inclusion of the helical conductor pairs 16, 17 and 18, 19, since they occupy the location of helical reinforcing cords in known forms of flexible hose. If a particular end use called for only a single pair of helical conductors, the second pair of helical conductors shown in FIGS. 1 and 2 would preferably be replaced by a pair of helical reinforcing cords, since the helical conductor pairs 16, 17 and 18, 19 also perform the function of retaining the longitudinal reinforcing cords 15 in place.

The last element applied to the mandrel in forming the hose is an outer vinyl plastic strip 20 which is preferably of the same width and thickness as the inner plastic strip 14. It overlaps itself over the first wire 10, forward edge portion overlying rearward edge portion, while the central portion overlies the second wire 11. By the use of heat or solvents or both, the outer strip is bonded to the inner strip with the longitudinal cords 15 embedded therebetween and the helical conductors 16, 17, 18 and 19 slidably positioned therebetween. The inner and outer strips 14 and 20 may be of dissimilar materials, the inner being selected, for example, for chemical resistance and the other for abrasion resistance or aesthetic quality.

Figure 3:
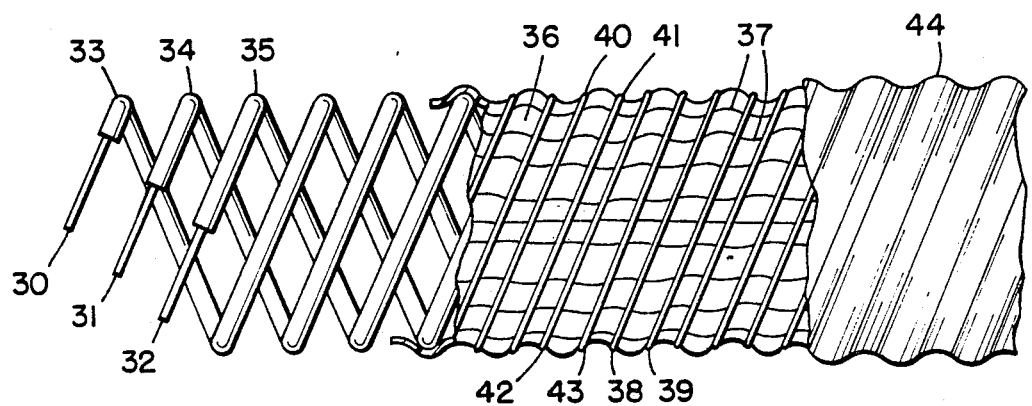
FIG. 3 is a side elevation, partly broken away, of a triple support wire hose embodying the invention.
Figure 4:
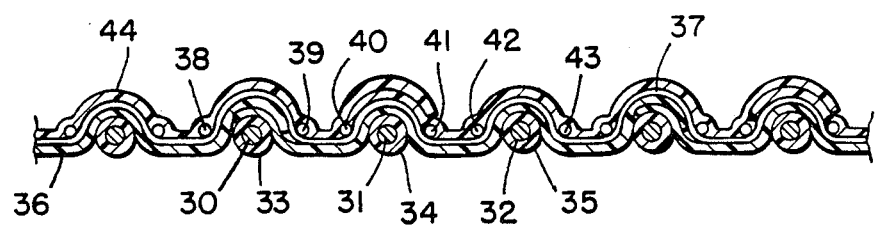
FIG. 4 is an enlarged section of the wall of the hose of FIG. 3.

In the second preferred embodiment of the invention shown in FIGS. 3 and 4, the hose construction and the manner of forming it are generally as described above for the first preferred embodiment, except for the inclusion of a third helical support member. The three helical support members 30, 31 and 32 have a greater helical pitch than their counterparts in the first embodiment, viz., about 0.450", and may be conductive or non-conductive; if conductive, they are preferably coated with concentric layers of vinyl plastic 33, 34, and 35, respectively. An inner plastic strip 36 is helically wrapped about the three helical support members 30, 31 and 32, the width of strip 36 being slightly greater than the triple lead of the helical support members so as to overlap itself over the first helical support member 30. Thus, as shown in FIG. 4, the rearward edge of strip 36 overlies the first support member 30; the central portion of strip 36 overlies the spaced-apart second and third support members 31 and 32; and the forward edge of strip 36 overlies the following convolution of the first support member 30. As in the first embodiment, the strip 36 is in contact with and bonded to the coatings 33, 34 and 35.

A plurality of longitudinal reinforcing cords 37 are next applied, as in the first embodiment. Pairs of helical conductors 38 and 39, 40 and 41, 42 and 43 are then wrapped helically about the partially-formed hose structure so as to straddle the helical support members 30, 31 and 32, respectively. Depending upon the end use of the hose, one or two of the helical conductor pairs 38 and 39, 40 and 41, 42 and 43 may be replaced with helical reinforcing cords. The last element applied is an outer plastic strip 44 which overlaps itself over the second helical support member 31, and has its central portion overlying the first and third helical support members 30 and 32.

In the form of this second embodiment in which the helical support members 30, 31 and 32 are conductive, they can provide positive, negative and ground leads for electrical apparatus at either end of the hose. The several variations in construction referred to in the description of the first embodiment may also be made in this second embodiment. As a consequence of these many features, a current-carrying hose construction is provided which is of maximum versatility, flexibility, abrasion resistance, optimum longitudinal and radial strength, and minimal wire weight and voltage resistance. The scope of the invention is not to be limited to the specific embodiments herein described, but rather to the following claims.

We claim:

1. A current-carrying flexible hose comprising:
    (a) first and second parallel helical support members disposed in double lead fashion with successive convolutions alternating;
    (b) an inner plastic strip wrapped helically about said support members with forward and rearward edge portions of said inner plastic strip overlapping convolutions of the second of said support members;
    (c) an outer plastic strip wrapped helically about said inner plastic strip with forward and rearward edge portions of said outer plastic strip overlapping convolutions of the first of said support members; and
    (d) at least one pair of helical electrical conductors disposed on opposite sides of one of said support members and slidably positioned between said inner and outer plastic strips, each of said helical electrical conductors comprising:
        (i) a conductive elements; and
        (ii) a dielectric plastic coating disposed around said conductive element.

2. A hose according to claim 1, wherein each of said first and second helical support members is electrically conductive, and each has a dielectric plastic coating.

3. A hose according to claim 1, wherein:
    (a) only one parallel helical support member has a pair of helical electrical conductors disposed on opposite sides thereof and slidably positioned between said inner and outer plastic strips, each of said helical electrical conductors comprising:
        (i) a conductive element; and (ii) a dielectric plastic coating disposed around said conductive element; and (b) the other parallel helical support member has a pair of helical reinforcing cords disposed on opposite sides thereof and embedded between said inner and outer plastic strips.

4. A hose according to claim 1, wherein each of said first and second helical support members has a pair of helical electrical conductors disposed an opposite sides thereof and slidably positioned between said inner and outer plastic strips, each of said helical electrical conductors comprising:

(i) a conductive element; and (ii) a dielectric plastic coating disposed around said conductive element.

5. A hose according to claim 1, further comprising a plurality of longitudinal reinforcing cords disposed between said inner plastic strip and said at least one pair of helical electrical conductors.

6. A currently-carrying flexible hose comprising:

(a) first, second and third parallel helical support members disposed in triple lead fashion with successive convolutions alternating;

(b) an inner plastic strip wrapped helically about said support members with forward and rearward edge portions of said inner plastic strip overlapping convolutions of one of said support members;

(c) an outer plastic strip wrapped helically about said inner plastic strip with forward and rearward edge portions of said outer plastic strip overlapping convolutions of another of said support members; and (d) at least one pair of helical electrical conductors disposed on opposite sides of one of said support members and slidably positioned between said inner and outer plastic strips, each of said helical electrical conductors comprising:

(i) a conductive element; and (ii) a dielectric plastic coating disposed around said conductive element.

7. A hose according to claim 6, wherein each of said first, second and third helical support members is electrically conductive and each has a dielectric plastic coating.

8. A hose according to claim 6, wherein:

(a) only one parallel helical support member has a pair of helical electrical conductors disposed on opposite sides thereof and slidably positioned between said inner and outer plastic strips, each said helical electrical conductors comprising:

(i) a conductive element; and (ii) a dielectric plastic coating disposed around said conductive element; and (b) the other parallel helical support members each have a pair of helical reinforcing cords disposed on opposite sides thereof and embedded between said inner and outer plastic strips.

9. A hose according to claim 6, wherein;

(a) each of two of said parallel helical support members has a pair of helical electrical conductors disposed on opposite sides thereof and slidably positioned between said inner and outer plastic strips, each of said helical electrical conductors comprising:

(i) a conductive element; and (ii) a dielectric plastic coating disposed around said conductive element; and (b) the other parallel helical support member has a pair of helical reinforcing cords disposed on opposite sides thereof and embedded between said inner and outer plastic strips.

10. A hose according to claim 6, wherein each of said three parallel helical support members has a pair of helical conductors disposed on opposite sides thereof and slidably positioned between said inner and outer plastic strips, each of said helical electrical conductors comprising:

(i) a conductive element; and (ii) a dielectric plastic coating disposed around said conductive element.

11. A hose according to claim 6, further comprising a plurality of longitudinal reinforcing cords disposed between said inner plastic strip and said at least one pair of helical electrical conductors.

* * * * *